(12) United States Patent
Harvell et al.

(10) Patent No.: US 11,549,506 B2
(45) Date of Patent: Jan. 10, 2023

(54) WELLSITE ELECTRICAL POWER MANAGEMENT SYSTEM

(71) Applicant: STEWART & STEVENSON LLC, Houston, TX (US)

(72) Inventors: Chris Harvell, Houston, TX (US); Paul Smith, Houston, TX (US); Mark Payne, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 96 days.

(21) Appl. No.: 16/933,601

(22) Filed: Jul. 20, 2020

(65) Prior Publication Data

US 2021/0025382 A1 Jan. 28, 2021

Related U.S. Application Data

(60) Provisional application No. 62/878,575, filed on Jul. 25, 2019.

(51) Int. Cl.

| | |
|---|---|
| *F04B 49/06* | (2006.01) |
| *E21B 43/26* | (2006.01) |
| *F04B 15/02* | (2006.01) |
| *F04B 17/03* | (2006.01) |
| *F04B 49/20* | (2006.01) |

(Continued)

(52) U.S. Cl.
CPC ............ *F04B 49/065* (2013.01); *E21B 4/04* (2013.01); *E21B 7/022* (2013.01); *E21B 21/062* (2013.01); *E21B 41/0085* (2013.01); *E21B 43/00* (2013.01); *E21B 43/003* (2013.01); *E21B 43/12* (2013.01); *E21B 43/16* (2013.01);

(Continued)

(58) Field of Classification Search
CPC ........ F04B 49/065; F04B 15/02; F04B 17/03; F04B 17/06; F04B 23/04; F04B 23/06; F04B 47/00; F04B 47/02; F04B 49/00; F04B 49/02; F04B 49/20; F04B 2203/00; F04B 2203/0209; F04B 2207/01; E21B 4/04; E21B 7/022; E21B 21/062; E21B 41/0085; E21B 43/00; E21B 43/003; E21B 43/12; E21B 43/16; E21B 43/26; E21B 43/2605; E21B 43/2607; E21B 43/267; E21B 47/008; H02J 3/381
See application file for complete search history.

(56) References Cited

U.S. PATENT DOCUMENTS

| | | | | |
|---|---|---|---|---|
| 9,893,500 | B2* | 2/2018 | Oehring | H02J 3/0073 |
| 9,970,278 | B2* | 5/2018 | Broussard | E21B 43/26 |
| 2016/0105022 | A1* | 4/2016 | Oehring | H02J 9/066 |
| | | | | 307/29 |

* cited by examiner

*Primary Examiner* — Peter J Bertheaud
(74) *Attorney, Agent, or Firm* — Ewing & Jones, PLLC

(57) ABSTRACT

A method includes supplying a plurality of generators, each generator in electrical communication with a switchgear with each switchgear in data communication with a generator data management system. The method also includes supplying a plurality of electrically driven fracturing pumps with each electrically driven fracturing pump in data communication with pump data management system. Further, the method includes supplying a load shedding system, the load shedding system in data communication with the generator data management system and a pump control system, the pump control system in data communication with the pump data management system. The method includes determining which pumps should have speed reduced by the load shedding system and reducing the speed of the pumps determined by the load shedding system using the pump control system.

12 Claims, 4 Drawing Sheets

(51) Int. Cl.
*H02J 3/38* (2006.01)
*F04B 23/06* (2006.01)
*E21B 43/267* (2006.01)
*E21B 47/008* (2012.01)
*E21B 21/06* (2006.01)
*E21B 43/00* (2006.01)
*E21B 43/12* (2006.01)
*E21B 7/02* (2006.01)
*E21B 43/16* (2006.01)
*E21B 41/00* (2006.01)
*E21B 4/04* (2006.01)
*F04B 23/04* (2006.01)
*F04B 47/02* (2006.01)
*F04B 17/06* (2006.01)
*F04B 49/00* (2006.01)
*F04B 49/02* (2006.01)
*F04B 47/00* (2006.01)

(52) U.S. Cl.
CPC .......... *E21B 43/26* (2013.01); *E21B 43/2605* (2020.05); *E21B 43/267* (2013.01); *E21B 43/2607* (2020.05); *E21B 47/008* (2020.05); *F04B 15/02* (2013.01); *F04B 17/03* (2013.01); *F04B 17/06* (2013.01); *F04B 23/04* (2013.01); *F04B 23/06* (2013.01); *F04B 47/00* (2013.01); *F04B 47/02* (2013.01); *F04B 49/00* (2013.01); *F04B 49/02* (2013.01); *F04B 49/20* (2013.01); *H02J 3/381* (2013.01); *F04B 2203/00* (2013.01); *F04B 2203/0209* (2013.01); *F04B 2207/01* (2013.01)

WELLSITE ELECTRICAL POWER MANAGEMENT SYSTEM

CROSS REFERENCE TO RELATED APPLICATIONS

The present application claims priority to U.S. Provisional Application Ser. No. 62/878,575 filed on Jul. 25, 2019 and incorporated herein.

BACKGROUND

Wellsite operations, in particular, electrically driven fracturing pumps and other electrically powered equipment onsite including, but not limited to, blenders and CAS units, place demands on the generators located on-site. Typically, one or more generators provide electrical power to one or more switchgear units. The switchgear units in turn distribute electrical power to on-site systems such as the electrically driven fracturing pumps, slurry pumps and other devices. If an electrically-powered element of one or more of the on-site systems draws electricity in excess of what can be provided by the one or more generators or one or more switchgear units, circuit protection of the switchgear will trip, resulting in shutting down of the associated generator. Because a single generator may provide power to more than one unit, the draw by an electrically powered element may cause several on-site systems to cease operations.

SUMMARY

In certain embodiments, a method is disclosed. The method includes supplying a plurality of generators, each generator in electrical communication with a switchgear with each switchgear in data communication with a generator data management system. The method also includes supplying a plurality of electrically driven fracturing pumps with each electrically driven fracturing pump in data communication with pump data management system. Further, the method includes supplying a load shedding system, the load shedding system in data communication with the generator data management system and a pump control system, the pump control system in data communication with the pump data management system. The method includes determining which pumps should have speed reduced by the load shedding system and reducing the speed of the pumps determined by the load shedding system using the pump control system.

DETAILED DESCRIPTION

Figure 1:
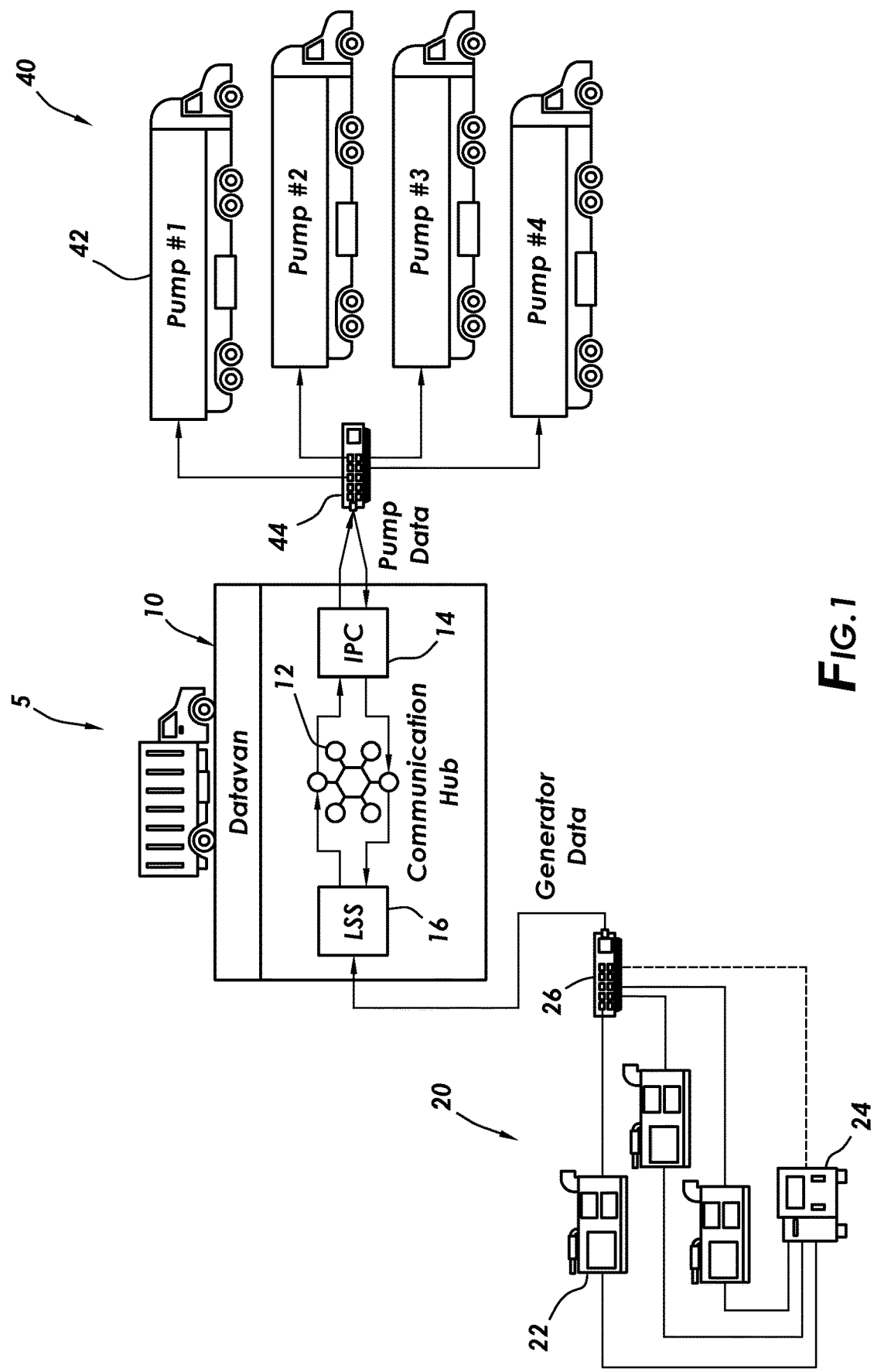
FIG. 1 is a graphical depiction of frac site including an electrical power management system (EPMS) consistent with at least one embodiment of the present disclosure.

FIG. 1 depicts a frac site 5 including generator domain 20, electrical power management system (EPMS) 10 and pump domain 40, all in data communication with one another. Generator domain 20 may include plurality of generators 22 in electrical communication with switchgear 24. While shown as a single set of generators 22 and a single switch gear 24, one of ordinary skill in the art with the benefit of this disclosure will understand that generator domain 20 may include multiple sets of generators 22 corresponding with multiple switch gears 24. Generators 22 are in data communication with generator data management system 26. Generator data management system 26 monitors the status of generators 22, including power output, generators running and not running, and status of generators 22. Generator data management system 26 includes non-transitory computer readable medium having instructions stored thereon. Generator data management system 26 is in data communication with load shedding system 16, further described herein below.

As further shown in FIG. 1, pump domain 40 includes electrically driven fracturing pumps 42. Electrically driven fracturing pumps 42 are in data communication with pump data management system 44. Pump data management system 44 monitors which of electrically driven fracturing pumps 42 are in operation, the speed at which electrically driven fracturing pumps 42 are operating, and the status of electrically driven fracturing pumps 42. Pump data management system 44 includes non-transitory computer readable medium having instructions stored thereon. Pump data management system 44 is in data communication with pump control system 14, further described herein below.

Pump control system 14 and load shedding system 16 are in data communication with communications hub 12. Communications hub 12 includes an operator interface for setup and communication management of the operation of electrically driven fracturing pumps 42, generators 22, electrically driven blending units 62, described further hereinbelow, CAS units, hydrators, data van, and other frac site equipment. Communications hub 12 may include software, or hardware and software. Communications hub 12 further provides a pathway for data and commands between pump control system 14 and load shedding system 16. The combination of communication hub 12, pump control system 14, and load shedding system 16 comprise electrical power management system (EPMS) 10. In certain embodiments, EPMS 10 may be housed in a data van. In other embodiments, EPMS 10 may be a static system.

Figure 2:
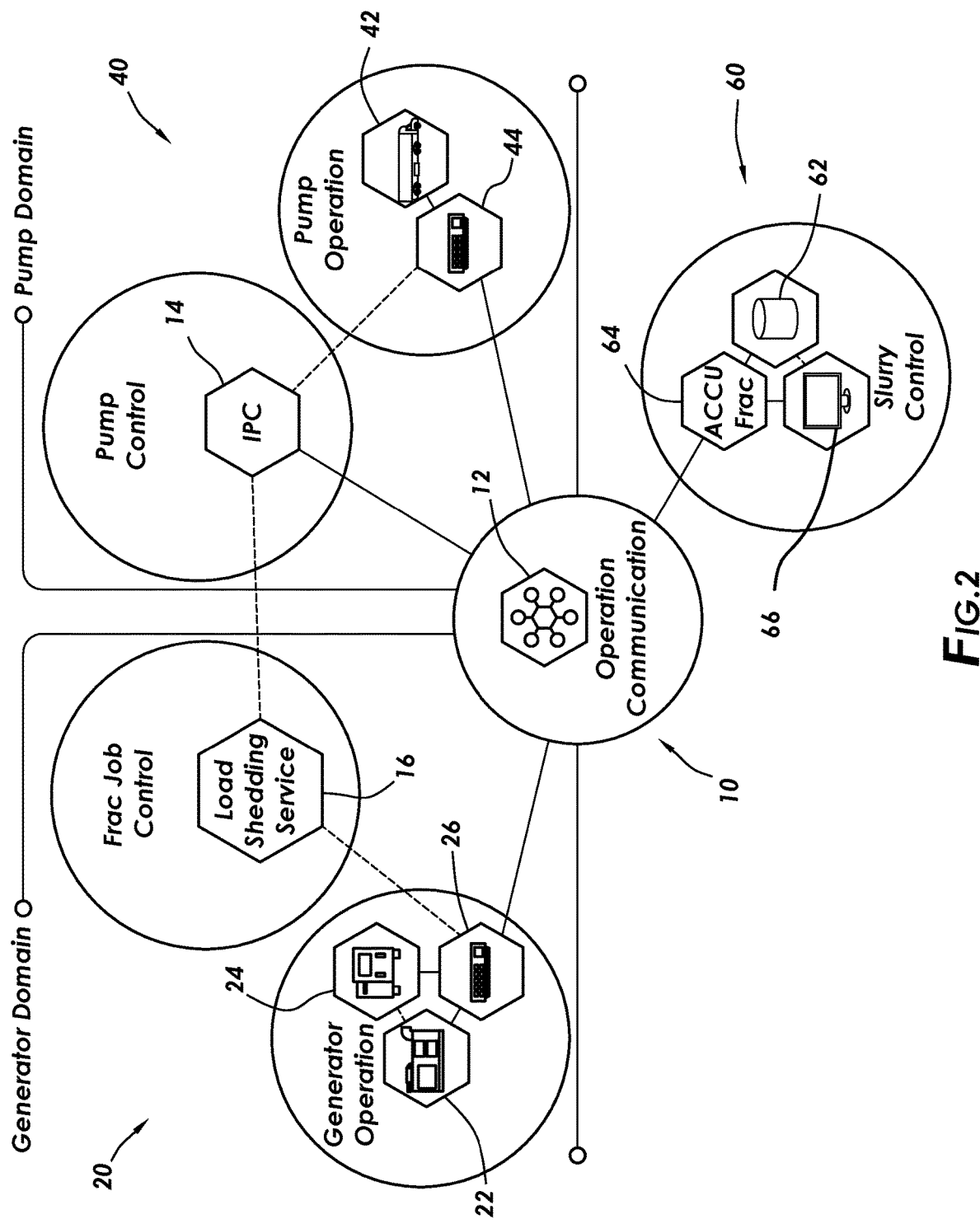
FIG. 2 schematically depicts the integration of the communication hub of the wellsite electrical power management system with the electrical generators, the electrically driven fracturing pumps and the slurry control system.

As depicted in FIG. 2, central communication hub 12 coordinates communications between the domains. In the example shown in FIG. 2, those three domains are generator domain 20, pump domain 40 and slurry domain 60. As described above with respect to FIG. 6, pump domain 40 includes electrically driven fracturing pumps 42, pump data management system 44, and pump control system 14. Slurry domain 60 includes electrically driven blending units 62, which provide slurry to pump domain 40 and blending operational control 64. Generator domain 20 includes generators 22, switchgear 24, generator data management system 26, and load shedding system 16.

Figure 3A:
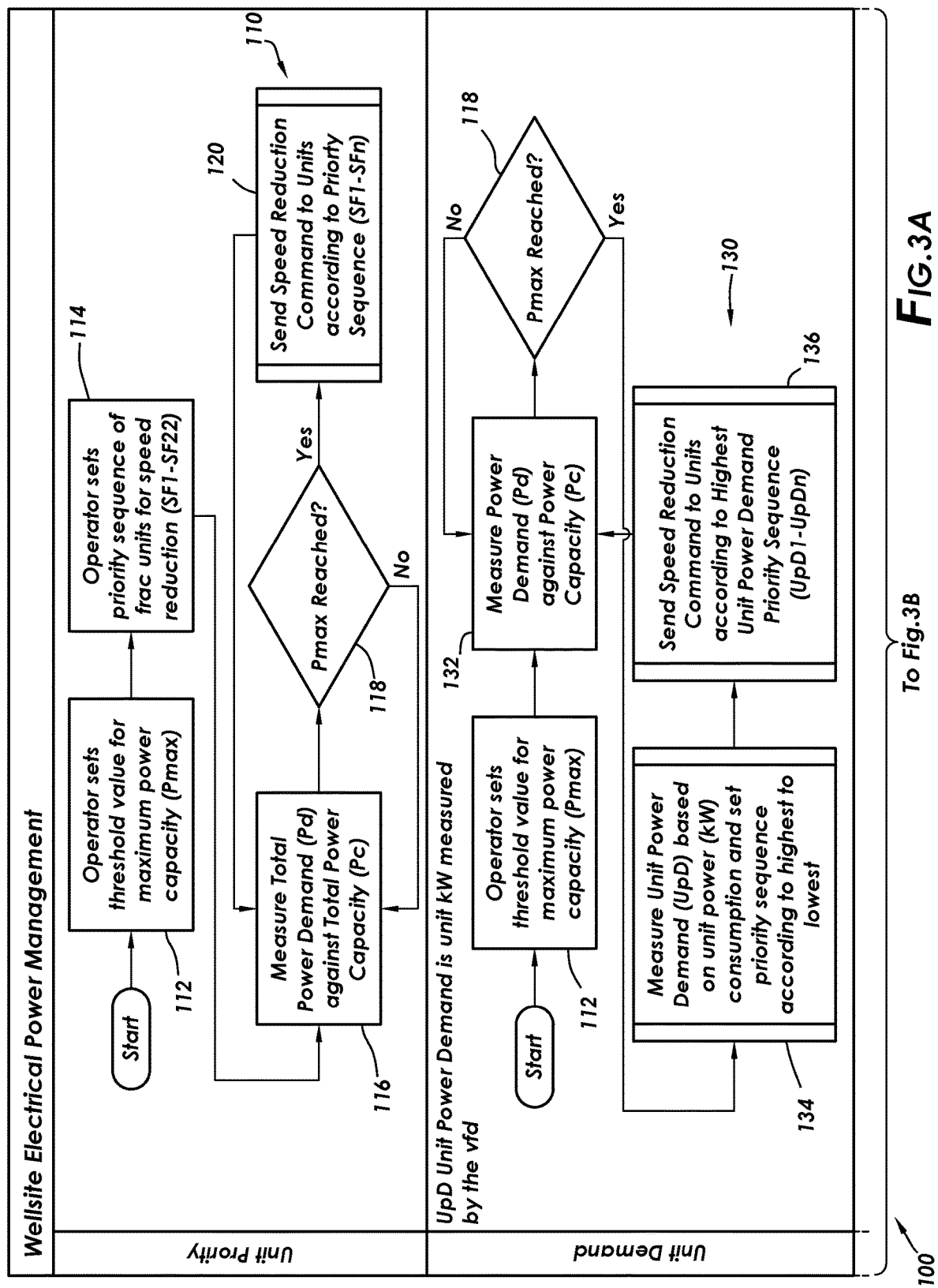
FIGS. 3a and 3b. are flow chart representations of four examples of unit demand load shedding algorithms.
Figure 3B:
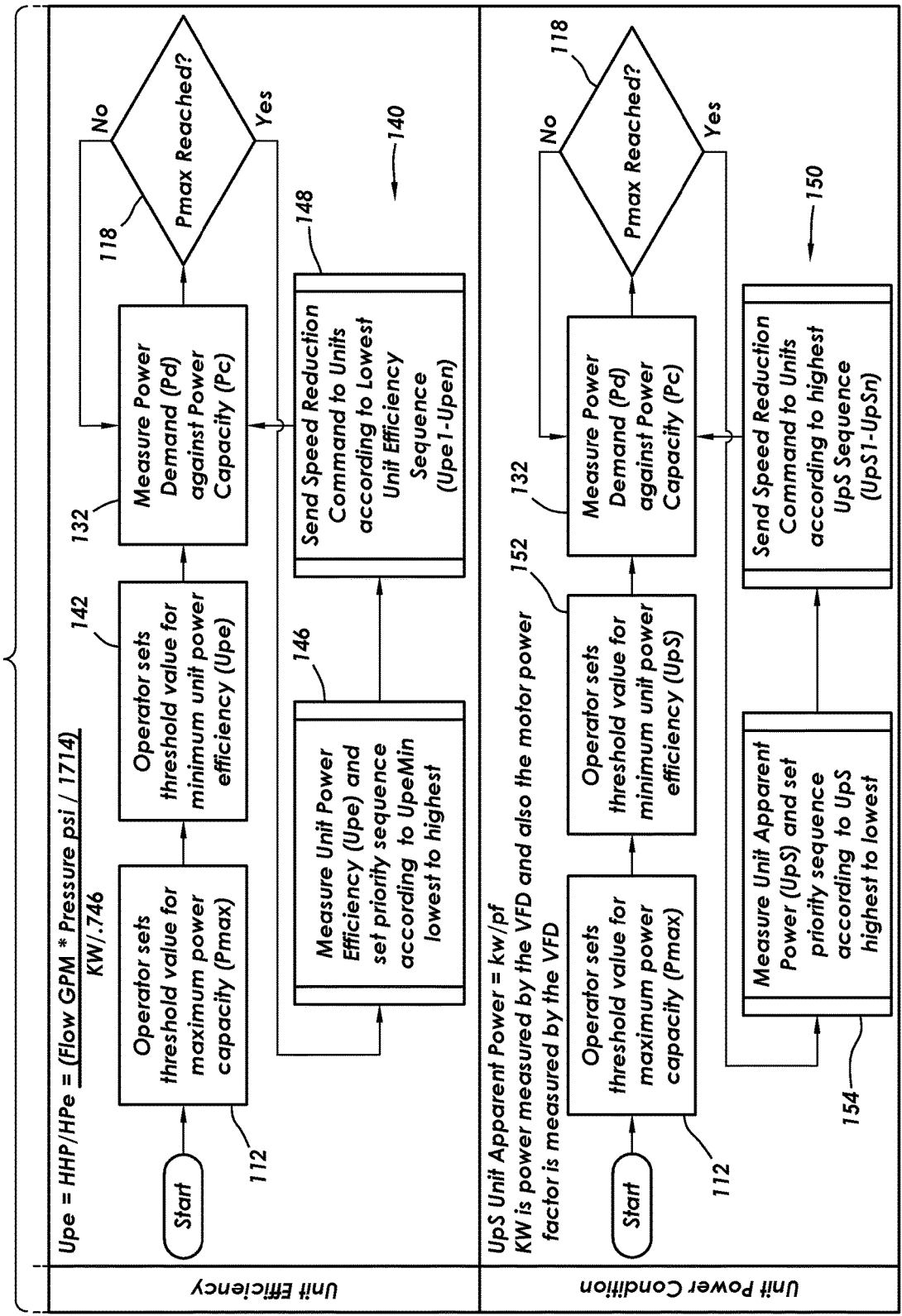

Criteria for load shedding system 16 may be established based on individual generator 22 capacity and power needs of the electrical motors of electrically driven fracturing pumps 42 receiving power from that individual generator 22. Non-limiting examples of loading shedding algorithms 100 used in load shedding system 16 are depicted in FIGS. 3a and 3b. FIG. 3a depicts unit priority load shedding algorithm 110. In unit priority load shedding algorithm 110, an operator sets the threshold value for maximum power capacity (Pmax) (112) for a generator 22. The operator further sets the priority sequence of frac units for speed reduction, i.e., electrically driven fracturing pumps 42 (114).

Load shedding system 16 measures the total power demand (Pd) against the total power capacity (116). If Pmax has not been reached by Pd, load shedding system 16 continues to measure Pd. If Pmax is reached (118), load shedding system 16 sends pump control system 14 a speed reduction command to electrically driven fracturing pumps 42 to reduce speed to on particular electrically driven fracturing pumps in the order previously designated by the operator (120). After the speed has been reduced to the designated speed for electrically driven fracturing pumps 42, load shedding system 16 again measures Pd against Pmax (116). Further, when Pd has reached Pmax, load shedding system 16 may prevent additional electrically driven fracturing pumps 42 from starting.

In another example of a load shedding algorithm, unit demand load shedding algorithm 130 is depicted in FIG. 3a. In unit demand load shedding algorithm 130, an operator sets the threshold value for maximum power capacity (Pmax) (112) for a generator 22. Loading shedding system 16 measures Pd against power capacity (Pc) of each electrically driven fracturing pump (42) (132). If Pmax has not been reached, load shedding system 16 continues to measure Pd against Pc. If Pmax has been reached (118), load shedding system 16 measures Unit Power Demand (UpD) of electrically driven fracturing pumps 42 based on unit power (kW) and sets a highest unit power demand priority sequence according to highest to lowers unit power, i.e., each electrically driven fracturing pump (42) (134). Pump control system 14 sends a speed reduction command to electrically driven fracturing pump (42) according to highest unit power demand sequence, i.e., (UpD1 to UpDn) (136).

In yet another embodiment of a load shedding algorithm, unit efficiency load shedding algorithm 140 is depicted in FIG. 3b. In unit efficiency load shedding algorithm 140, an operator sets the threshold value for maximum power capacity (Pmax) (112) for a generator 22. The operator further sets a threshold value for minimum unit power efficiency (Upe) for each electrically driven fracturing pump (42) (142). In certain embodiments, Upe is defined as HHP/HPe (hydraulic horsepower/horsepower electric) which may be calculated by (Flow GPM*Pressure psi/1714)/KW/0.746. Loading shedding system 16 measures Pd against power capacity (Pc) of generator 22 (132). If Pmax has been reached (118), load shedding system 16 measures Upe and sets a priority sequence (lowest unit efficiency sequence) according to a minimum Upe (UpeMin) from lowest to highest UpeMin (146). Pump control system 14 sends a speed reduction command to electrically driven fracturing pump (42) according to lowest unit efficiency sequence (Upe1 to Upen) (148).

In another embodiment of a load shedding algorithm, unit power condition algorithm 150 is shown in FIG. 3b. In unit power condition algorithm 150, an operator sets the threshold value for maximum power capacity (Pmax) (112) for a generator 22. An operator further sets the threshold value for Unit Apparent Power (UpS) (152). Unit Apparent Power (kVA) is defined as the total power effect on the generator. It is the vector sum of real power in kW and reactive power, kVAR.

Loading shedding system 16 measures Pd against power capacity (Pc) of generator 22 (132). If Pmax has been reached (118), load shedding system 16 measures UpS and sets a priority sequence according to UpS (highest to lowest) (152). Pump control system 14 sends a speed reduction command to electrically driven fracturing pump (42) according to the priority sequence (UpS1-UpSn) (154).

In each of embodiments of the load shedding algorithm, once the command has been sent from pump control system 14, to electrically driven fracturing pumps 42 to reduce speed, electrically driven fracturing pumps 42 reduce speed as directed by the command.

In addition to controlling the speed of electrically driven fracturing pumps 42, load shedding system 16 may preclude the bringing online of additional electrically driven fracturing pumps 42 when the monitored generator 22 is already at the predetermined threshold. In another embodiment, the power demand of each electrically driven fracturing pump 42 may be stored within the pump data management system 44. If upon receiving a signal to initiate operation of an electrically driven fracturing pump 42, load shedding system 16 determines that the known power demand for initiating operation will exceed the predetermined threshold, then load shedding system 16 will preclude the bringing online of additional electrically driven fracturing pump 42.

In addition to controlling the speed of the electrically driven fracturing pumps 42, load shedding system 16 may control electrically driven support equipment, such as, but not limited to, blending units 62, CAS units, hydrators, and equipment associated with the operation of electrically driven fracturing pumps 42 in data communication with a support equipment data management system 66. As described above with respect to load shedding system algorithms shown in FIGS. 3 and 3b, load shedding system 16 may shut down support equipment in accordance with the priority algorithms.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A method comprising:
   supplying:
   a plurality of generators, each generator in electrical communication with a switchgear, each switchgear in data communication with a generator data management system;
   a plurality of electrically driven fracturing pumps, each electrically driven fracturing pump in data communication with pump data management system;
   a load shedding system, the load shedding system in data communication with the generator data management system; and
   a pump control system, the pump control system in data communication with the pump data management system;
   determining which pumps should have speed reduced by the load shedding system; and
   reducing the speed of the pumps determined by the load shedding system using the pump control system.

2. The method of claim 1 further comprising supplying a communications hub, the communications hub in data communication with the load shedding system and the pump control system.

3. The method of claim 2, wherein the load shedding system, the pump control system, and the communication hub are located in a data van.

4. The method of claim 1 further comprising supplying a plurality of electrically driven blending units and blending operation control.

5. The method of claim 1, wherein the step of determining which pumps should have speed reduced by the load shedding system comprises:
   a) setting a threshold value for maximum power capacity of a generator;
   b) setting a priority sequence of electrically driven fracturing pumps for speed control;
   c) measuring the total power demand (Pmax) for all electrically driven fracturing pumps;
   d) determining if Pmax has been reached; and
   e) if Pmax has been reached, sending speed reduction commands to electrically driven fracturing pumps according to the priority sequence.

6. The method of claim 1, wherein the step of determining which pumps should have speed reduced by the load shedding system comprises:
   a) setting a threshold value for maximum power capacity of a generator;
   b) measuring power demand (Pd) against power capacity (Pc);
   c) measuring the total power demand (Pmax) for all electrically driven fracturing pumps;
   d) determining if Pmax has been reached;
   e) if Pmax has been reached, measuring unit power demand (UpD) for each of the electrically driven fracturing pumps based on power consumption and setting a priority sequence from highest to lower UpD; and
   f) sending speed reduction commands to electrically driven fracturing pumps according to the priority sequence.

7. The method of claim 1, wherein the step of determining which pumps should have speed reduced by the load shedding system comprises:
   a) setting a threshold value for maximum power capacity of a generator;
   b) setting a threshold value for minimum unit power efficiency for each electrically driven fracturing pump (Upe);
   c) measuring power demand (Pd) against power capacity (Pc);
   d) measuring the total power demand (Pmax) for all electrically driven fracturing pumps;
   e) determining if Pmax has been reached;
   f) if Pmax has been reached, measuring Upe for each of the electrically driven fracturing pumps and setting a priority sequence from lowest to highest Upe, wherein Upe is hydraulic horsepower/horsepower electric;
   g) sending speed reduction commands to electrically driven fracturing pumps according to the priority sequence.

8. The method of claim 1, wherein the step of determining which pumps should have speed reduced by the load shedding system comprises:
   a) setting a threshold value for maximum power capacity of a generator;
   b) setting a threshold value for unit apparent power for each electrically driven fracturing pump (UpS);
   c) measuring power demand (Pd) against power capacity (Pc);
   d) measuring the total power demand (Pmax) for all electrically driven fracturing pumps;
   e) determining if Pmax has been reached;
   f) if Pmax has been reached, measuring UpS for each of the electrically driven fracturing pumps and setting a priority sequence from highest to lowest UpS, wherein UpS is unit apparent power;
   g) sending speed reduction commands to electrically driven fracturing pumps according to the priority sequence.

9. The method of claim 1, wherein the pump control system and load shedding system are in data communication with a communications hub.

10. The method of claim 9, wherein the communications hub includes an operator interface for setup and communication management of an operation of the electrically driven fracturing pumps, the generators, and electrically driven blending units.

11. The method of claim 10, wherein the communications hub further includes an operator interface for setup and management of an operation of CAS units, hydrators, and equipment associated with the operation of the electrically driven fracturing pumps.

12. The method of claim 1 further comprising:
   supplying support equipment, the support equipment including CAS units, hydrators, and equipment associated with the operation of the electrically driven fracturing pumps;
   supplying a support equipment data management system in data communication with the support equipment;
   determining which support equipment should be turned off by the load shedding system; and
   turning off the support equipment determined by the load shedding system using the support equipment control system.

* * * * *